United States Patent [11] 3,597,759

| [72] | Inventor | Arthur D. Hause<br>Watchung, N.J. |
|---|---|---|
| [21] | Appl. No. | 748,458 |
| [22] | Filed | July 29, 1968 |
| [45] | Patented | Aug. 3, 1971 |
| [73] | Assignee | Bell Telephone Laboratories, Incorporated<br>Murray Hill, N.J. |

[54] DISPLAY SYSTEM UTILIZING ORDERED DATA STRUCTURE
8 Claims, 15 Drawing Figs.

[52] U.S. Cl. .................................................. 340/324 A
[51] Int. Cl. ............................................. G06k 15/20,
G06f 7/22
[50] Field of Search ........................................ 340/324.1,
334, 152

[56] References Cited
UNITED STATES PATENTS

| 3,389,404 | 6/1968 | Koster | 340/324.1 |
| 3,298,013 | 1/1967 | Koster | 340/324.1 |
| 2,688,741 | 9/1954 | Saltarelli | 340/334 |
| 3,482,309 | 12/1969 | Bouchard | 340/324.1 |
| 3,500,327 | 3/1970 | Belcher et al. | 340/324.1 |

Primary Examiner—John W. Caldwell
Assistant Examiner—Glen R. Swann, III
Attorneys—R. J. Guenther and William L. Keefauver ABSTRACT: A limited interaction display system is described. The system features a display console equipped with a light pen and special logic circuitry which is controlled by ordered data signals stored in a memory. The system allows a user to interrogate displayed data and retrieve data interrelationships without the intervention of a computer.

PATENTED AUG 3 1971

INVENTOR
A. D. HAUSE
BY
R.O. Nimtz
ATTORNEY

FIG. 3

|  | SALES VOLUME | |
|---|---|---|
| DISTRICT MANAGER | ALDRIDGE, M.D. | KING, G.L. |
|  | BERG, M.O. | LEAR, A.H. |
| AREA MANAGER | BLACK, G.K. | MARK, B.R. |
|  | COHEN, L.J. | O'HARA, J.R. |
| SUPERVISOR | CRAMER, J.G. | PEARSON, D.C. |
|  | DAVIS, C.P. | SAND, P.V. |
| SALESMAN | FORD, B.J. | SIMS, G.A. |
|  | FRANK, W.L. | SMITH, C.A. |
|  | FURST, T.P. | SMITH, T.L. |
|  | HAMMEL, A.D. | STONE, P.T. |
| LEVEL | IRVIN, R.M. | TURNER, C.H. |
|  | KERN, R.F. |  |

FIG. 4

|  | SALES VOLUME | |
|---|---|---|
| DISTRICT MANAGER | ALDRIDGE, M.D. | KING, G.L. |
|  | BERG, M.O. | LEAR, A.H. |
| AREA MANAGER | BLACK, G.K. | MARK, B.R. |
|  | COHEN, L.J. | O'HARA, J.R. |
| SUPERVISOR | CRAMER, J.G. | PEARSON, D.C. |
|  | DAVIS, C.P. | SAND, P.V. |
| SALESMAN | FORD, B.J. | SIMS, G.A. |
|  | FRANK, W.L. | SMITH, C.A. |
|  | FURST, T.P. | SMITH, T.L. |
|  | HAMMEL, A.D. | STONE, P.T. |
| LEVEL | IRVIN, R.M. | TURNER, C.H. |
|  | KERN, R.F. |  |

FIG. 5

SALES VOLUME
$30,000

| | | |
|---|---|---|
| DISTRICT MANAGER | ALDRIDGE, M.D. | KING, G.L. |
| | BERG, M.O. | LEAR, A.H. |
| AREA MANAGER | BLACK, G.K. | MARK, B.R. |
| | COHN, L.J. | O'HARA, J.R. |
| SUPERVISOR | CRAMER, J.G. | PEARSON, D.C. |
| | DAVIS, C.P. | SAND, P.V. |
| SALESMAN | FORD, B.J. | SIMS, G.A. |
| | FRANK, W.L. | SMITH, C.A. |
| | FURST, T.P. | SMITH, T.L. |
| | HAMMEL, A.D. | STONE, P.T. |
| LEVEL | IRVIN, R.M. | TURNER, C.H. |
| | KERN, R.F. | |

FIG. 6

SALES VOLUME
$375,000

| | | |
|---|---|---|
| DISTRICT MANAGER | ALDRIDGE, M.D. | KING, G.L. |
| | BERG, M.O. | LEAR, A.H. |
| AREA MANAGER | BLACK, G.K. | MARK, B.R. |
| | COHEN, L.J. | O'HARA, J.R. |
| SUPERVISOR | CRAMER, J.G. | PEARSON, D.C. |
| | DAVIS, C.P. | SAND, P.V. |
| SALESMAN | FORD, B.J. | SIMS, G.A. |
| | FRANK, W.L. | SMITH, C.A. |
| | FURST, T.P. | SMITH, T.L. |
| | HAMMEL, A.D. | STONE, P.T. |
| LEVEL | IRVIN, R.M. | TURNER, C.H. |
| | KERN, R.F. | |

FIG. 7A
DATA FORMAT

FIG. 7B
IDENTITY WORDS-FIELD A

FIG. 7C
IDENTITY WORDS-FIELD B

FIG. 7E
LINKAGE WORDS FOR W. L. FRANK

FIG. 7D
MASK WORDS

FIG. 7F
SALES VOLUME LINKAGE WORD FOR W. L. FRANK

DISPLAY SYSTEM UTILIZING ORDERED DATA STRUCTURE

BACKGROUND OF THE INVENTION

1. Field of the Invention

This invention relates to data display systems. More particularly, this invention relates to systems for displaying data which are inherently ordered or interrelated in a preselected manner. Still more particularly, this invention relates to display systems which allow a user to explore data relationships in a simple and direct manner without requiring the intervention of a digital computer.

Cross-Reference to Related Application

Subject matter relating to the present invention is also contained in the copending U.S. Pat. application Ser. No. 748,368 filed this date by K. J. Busch and M. L. Flynn and assigned to the assignee of the present invention.

2. Description of the Prior Art

The last decade has seen a vast increase in the operating speed and computational power of digital computers. Coincident with the improvement in their capabilities, general purpose digital computers have been used to an ever-increasing extent to perform a great variety of tasks that are capable of being reduced to a series of steps suitable for execution by a computer. As the computer's success in arithmetical manipulation came to be accepted, more and more effort was expended to extend computer usage to increasingly complex problems.

At this point severe programming problems arose due to the mismatch of the respective abilities of men and computers. Although digital computers, once programmed, can perform computations at very high speeds, they are not yet suitable for use in problems involving complex induction or deduction since the steps needed to solve these problems are difficult to precisely define, and are thus not amenable to programming.

One solution to this problem has been to design systems which make maximum use of neither the computer's rapid speed nor man's complex logical capabilities, but rather maximize the efficiency of the man-machine system for real-time problem solving. The intercommunication that this solution requires has been achieved in several ways. The most effective means used to provide real-time man-machine problem solving capability in the prior art has been the combination of a digital computer with a display console.

A variety of display-associated computer systems have been developed and put into commercial and research use. One of these is the DISPLAY-8 system manufactured by the Digital Equipment Corporation (DEC). As described in the DEC *Small Computer Handbook*, 1967 Edition, DISPLAY-8 is a cathode-ray tube display system which contains its own general purpose computer. The system can display points, lines, and characters, and can perform extensive computations. It can be used as a self-contained display system or as a buffer display station in a large computer system.

Another system which makes use of the combination of a small computer and a display unit linked to a central computer is the Graphic-1 system described in the paper by W. H. Ninke entitled "Graphic-1—A Remote Graphical Display Console System" in the *Proceedings of the Fall Joint Computer Conference*, Vol. 27, Spartan Books, 1965, pages 839—846. In this system the small computer handled only the real-time response processing required to support the manipulation of the console input devices. It acted as a display data buffer and served to refresh the display. All other required processing was shifted to the central computer by using interconnecting data communication lines. The central computer performed data processing requests from the small computer between batch jobs.

A system having even more power was achieved by time-sharing the central computer between several display subsystems as in the Graphic-2 system described in an article by C. Christensen and E. Pinson entitled "Multifunction Graphics For a Large Computer System," *Proceedings of the Fall Joint Computer Conference*, Vol. 31, Spartan Books, 1967, pages 697—711. This system offers each user not only substantial processing power, but also rapid display response, resulting in a powerful problem-solving means.

The above systems are characterized in that they offer the user very powerful means for interaction with a computer. The cost of this power is high, both in monetary terms and in terms of the load on the digital computer. The use of the above systems for functions requiring a limited degree of interaction would be very inefficient. If the display is to be used primarily as an output device, extensive flexibility in display data manipulation is superfluous. Further, if the data to be displayed is slowly changing—monthly, weekly, or even daily,—continuous computer monitoring of the display is not required.

An example of a use for a limited interaction display facility is a management information system. A relatively inexpensive management information system involving a plurality of display consoles could be implemented using the present invention. A plurality of displays containing slowly varying data concerning the company's operations could be stored on separate tracks of a storage drum or disc and would thus be readily available for study. The data base might only need updating by a digital computer or other appropriate means on a daily basis. The entire data base would be available at each of the system consoles since the present invention allows interrogation and analysis of the data *without* modifying the data base in any manner.

It is an object of the present invention to provide a display system which can be used for limited interaction problem solving.

It is a more specific object of the present invention to provide a simple and relatively inexpensive display system which can be used to explore data associations without requiring monitoring by a digital computer.

SUMMARY OF THE INVENTION

In accordance with the present invention, these and other objects are achieved in a display terminal equipped to graphically display the ordered relationships that exist between graphically displayed elements. In this way data associations can be determined graphically for the purpose of searching or ranking the displayed graphical elements.

More particularly, the present invention comprises a combination of a recirculating memory containing ordered data signals, a display device taken in this instance to be a cathode-ray tube, a means, such as a light pen, for selecting portions of the displayed data, and logic circuitry.

The light pen enables the user to select particular subdivisions of the data displayed on the cathode-ray tube. The logic circuitry is capable of detecting and distinguishing between individual subdivisions in the ordered data signals as they are periodically received from the memory. The circuitry brightens the displayed elements of particular subdivisions which have been selected by the light pen.

The major advantage of the present invention over the prior art is its provision for user interaction with a display without requiring real-time or online computational support from an associated computer.

DETAILED DESCRIPTION

Figure 1:
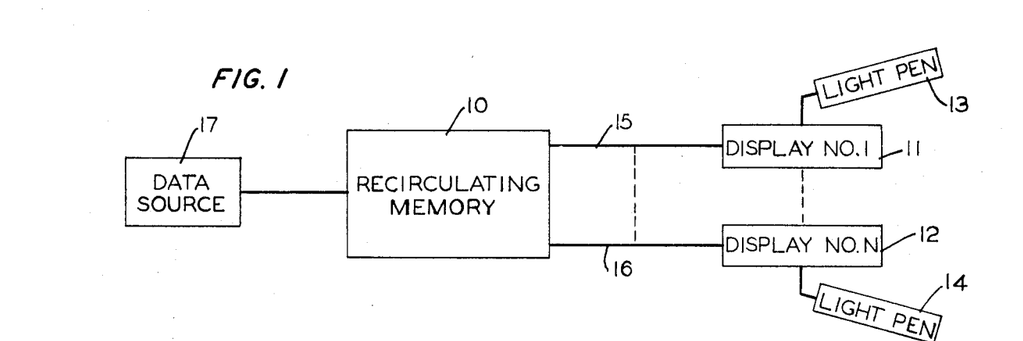
FIG. 1 is a general block diagram of a system utilizing the present invention.

Referring more particularly to FIG. 1, there is shown a general block diagram of a display system in accordance with the present invention comprising a recirculating memory 10 and a plurality of display consoles 11, 12 and their associated light pens 13, 14. The display consoles are refreshed by the data flow from the memory through the lines 15, 16. The source from which the data are loaded into the recirculating memory is not relevant to the present invention. Such sources have been illustrated generically in FIG. 1 by data source 17. For example, in the case in which the recirculating memory comprises a disc it is within the scope of this invention for the disc pack to have been written by a computer at a different physical location, and to have been transported to the display system for analysis.

Before describing the present invention in detail, it is advantageous first to consider the type of data associations that can be analyzed, and second a simple example which illustrates the interaction capability that can be achieved.

The present invention provides the capability of interacting with a data base which comprises arbitrarily constructed sets of displayable elements. The displayable elements comprise three types: those merely associated with a plurality of sets; those which act as light buttons and help identify particular sets; and dual function elements that act as light buttons for only a subplurality of the sets with which they are associated.

Each of these types of displayable elements requires several memory words to define them. The nonlight-button elements have one *linkage word* for each set to which they belong. The elements that function strictly as light buttons have an *identity word* which serves both to distinguish them from the other light buttons and also to identify a particular class of sets. The dual function elements have identity words for the sets they help to identify and linkage words for sets to which they belong but do not help to identify.

In addition to linkage words and identity words, mask words are also used. Each displayable element that has an identity word has an associated mask word. The mask word serves to pick the field of interest in the identity word. A full word mask is used for linkage words since all fields in a linkage word contain information. The use of mask words allows the logic circuitry to be independent of any data structure giving it a large degree of generality.

These identity, linkage, and mask words are data control words in the sense that, through the logic circuitry they modulate the actual display-generating signals that control the cathode-ray tube deflection circuits. The exact nature of the display-generating signals is determined by both the type of image to be displayed and the particular display console used in any specific application of the invention, and would be readily apparent to one of ordinary skill in the art. The particular data structure to be displayed determines the format of the identity, linkage, and mask words used. The manner in which the format is determined can be more readily understood through the consideration of the specific example shown in FIG. 2.

Figure 2:
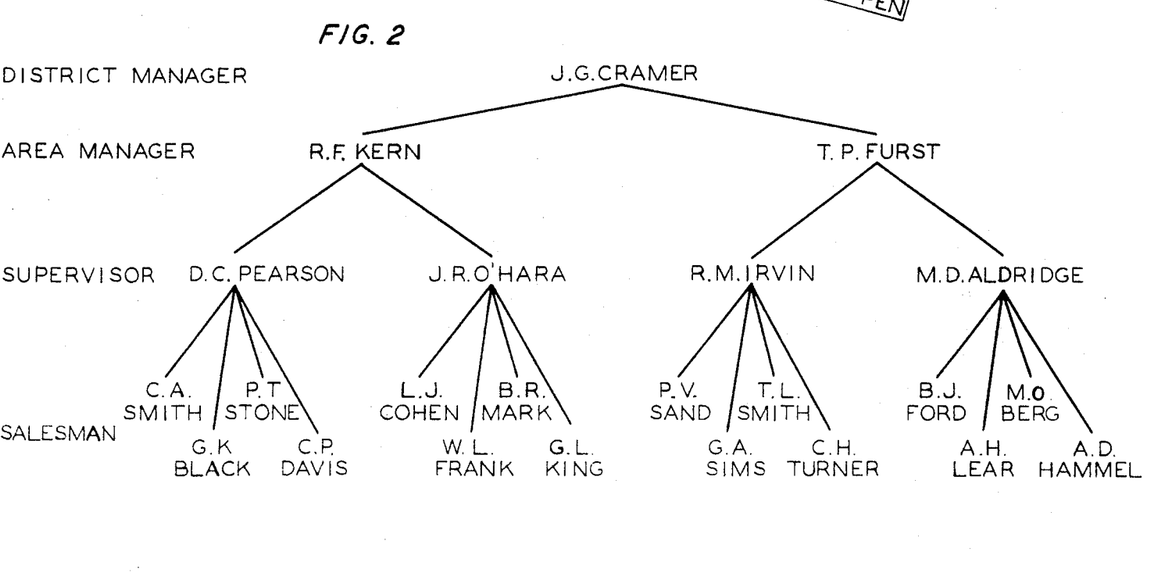
FIG. 2 is one example of a type of data structure that can be analyzed with the aid of the present invention.

FIG. 2 is a representation of an organizational chart of the sales division of a company. This particular data structure was chosen for simplicity of exposition and does not imply that the data analysis capability of the present invention is constrained to this type of data structure.

Figure 3:
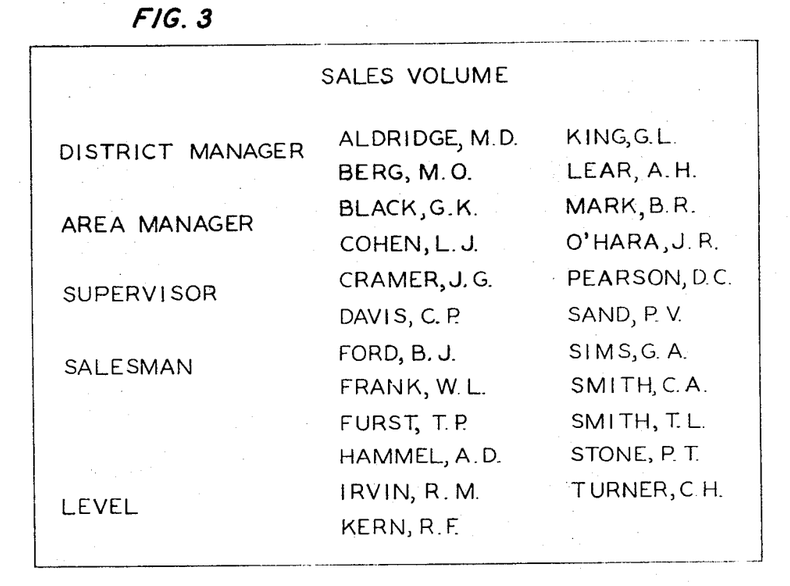
FIGS. 3, 4, 5 and 6 show an example of data structure analysis which is useful in understanding the present invention.

The organizational chart of FIG. 2 would be displayed as in FIG. 3. The titles on the left side of the display function strictly as light buttons to identify classes of sets which in this example are the different managerial levels in the organizational structure. The men's names function as light buttons and serve to identify classes of sets which in this example are the men supervised by the selected man plus sales volumes. The words SALES VOLUME at the top of the display are not part of the data structure and are not light pen selectable. They merely serve as a label for the blank area immediately beneath them. Nonlight-button elements corresponding to each man's sales are "displayed" beneath the SALES VOLUME label. These values are displayed with the intensity off and thus are invisible until the proper light buttons have been selected, as shown below. The men above the "SALESMAN" level in the structure have two sales volumes associated with their names; their personal sales volume and the total sales volume of the men under their direction. The LEVEL button allows searching across the data structure at any of the four levels.

Figure 4:
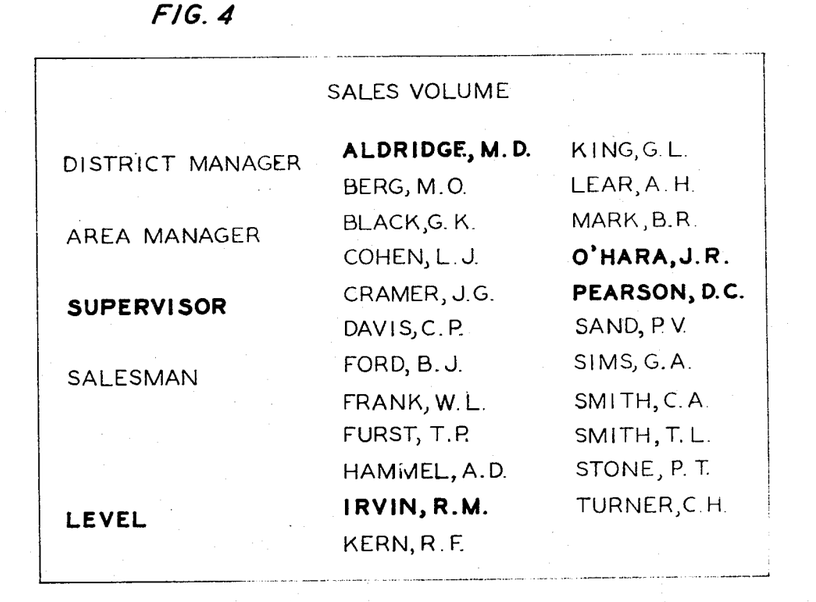
Figure 5:
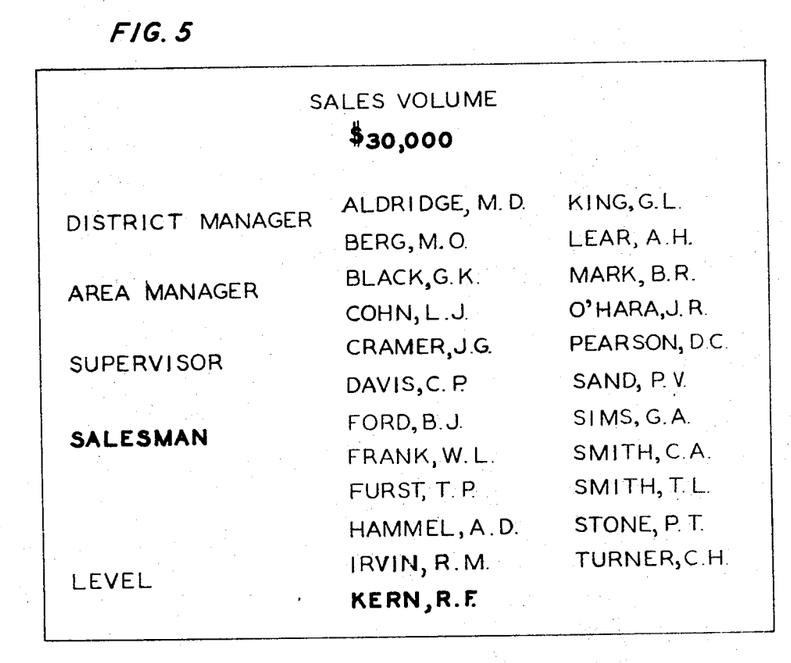
Figure 6:
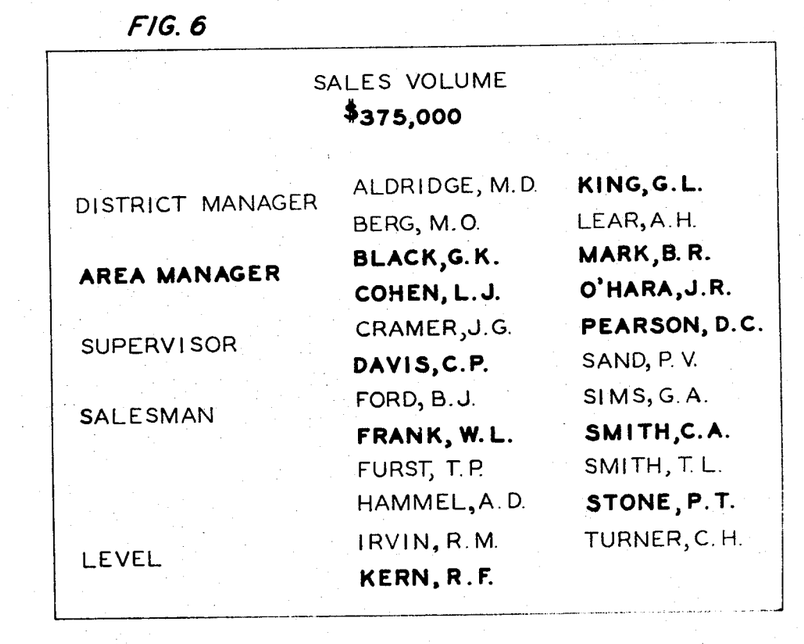

Selected data associations are confirmed by the brightening of the appropriate elements. For example, selection of SUPERVISOR and LEVEL would result in the brightening of the names of all the men who are supervisors as shown in FIG. 4. The selection of a name, for example, R. F. KERN, and SALESMAN would result in the individual's personal sales volume being displayed as in FIG. 5. As shown in FIG. 2, R. F. Kern is also an Area Manager. His sales volume as an Area Manager is found by selecting R. F. KERN and AREA MANAGER with the result shown in FIG. 6. It is seen that this selection identifies both the total sales volume of his area and the salesmen who work for him.

Figure 7A:
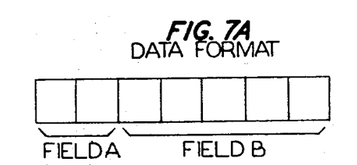
FIGS. 7A, 7B, 7C, 7D, 7E, and 7F show the format of certain data words associated with the example shown in FIGS. 3, 4, 5 and 6.
Figure 7B:
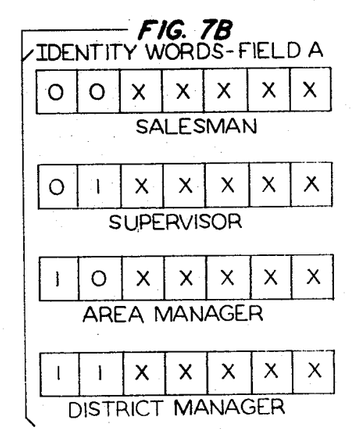
Figure 7C:
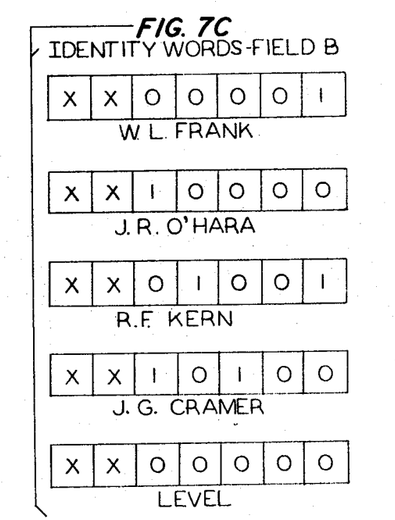
Figure 7D:
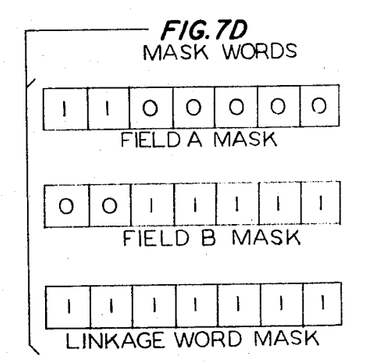
Figure 7E:
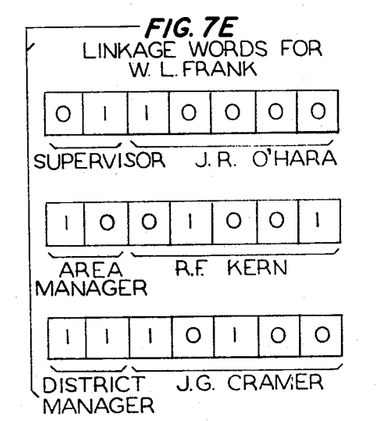

It can be seen that this example uses light button elements, dual function elements, and nonlight-button elements. Thus the data control words can be formatted as in FIGS. 7A through 7F. This particular example has only two classes of sets; the class of managerial positions, and the class of all members of the sales division. Thus the data format as shown in FIG. 7A requires only two fields; the first field, field A, corresponds to the managerial light button elements and thus requires two bits; the second field, field B, corresponds to the LEVEL button and the light buttons formed by the 23 names and thus requires five bits. FIG. 7B shows managerial light button identity words and FIG. 7C shows examples of the identity words associated with the men's names and with the LEVEL button. The particular bit assignments made in each case are entirely arbitrary. In each case the x's represent "don't care" conditions. Since the identity words have two fields, two mask words are required, one for each field as shown in FIG. 7D. Linkage words, which have information in both fields require a full word mask as also shown in FIG. 7D. The light buttons corresponding to the men's names are dual function elements since, for example, W. L. FRANK helps to define the set [W. L. Frank, Salesman] but is only a member of the sets [J. R. O'Hara, supervisor W. L. Frank], [R. F. Kern, Area Manager—W. L. Frank] and [J. G. Kramer, District Manager—W. L. Frank]. Thus, each man's name requires an identity word and three linkage words to associate him with his Supervisor, Area Manager, and District Manager. The linkage words for W. L. FRANK are shown in FIG. 7E.

Figure 7F:
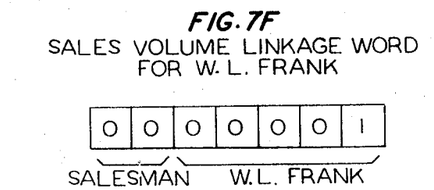

The values of the sales volumes are the nonlight-button elements. Each sales volume has one associated linkage word as shown for example in FIG. 7F, and no identity word.

Figure 8:
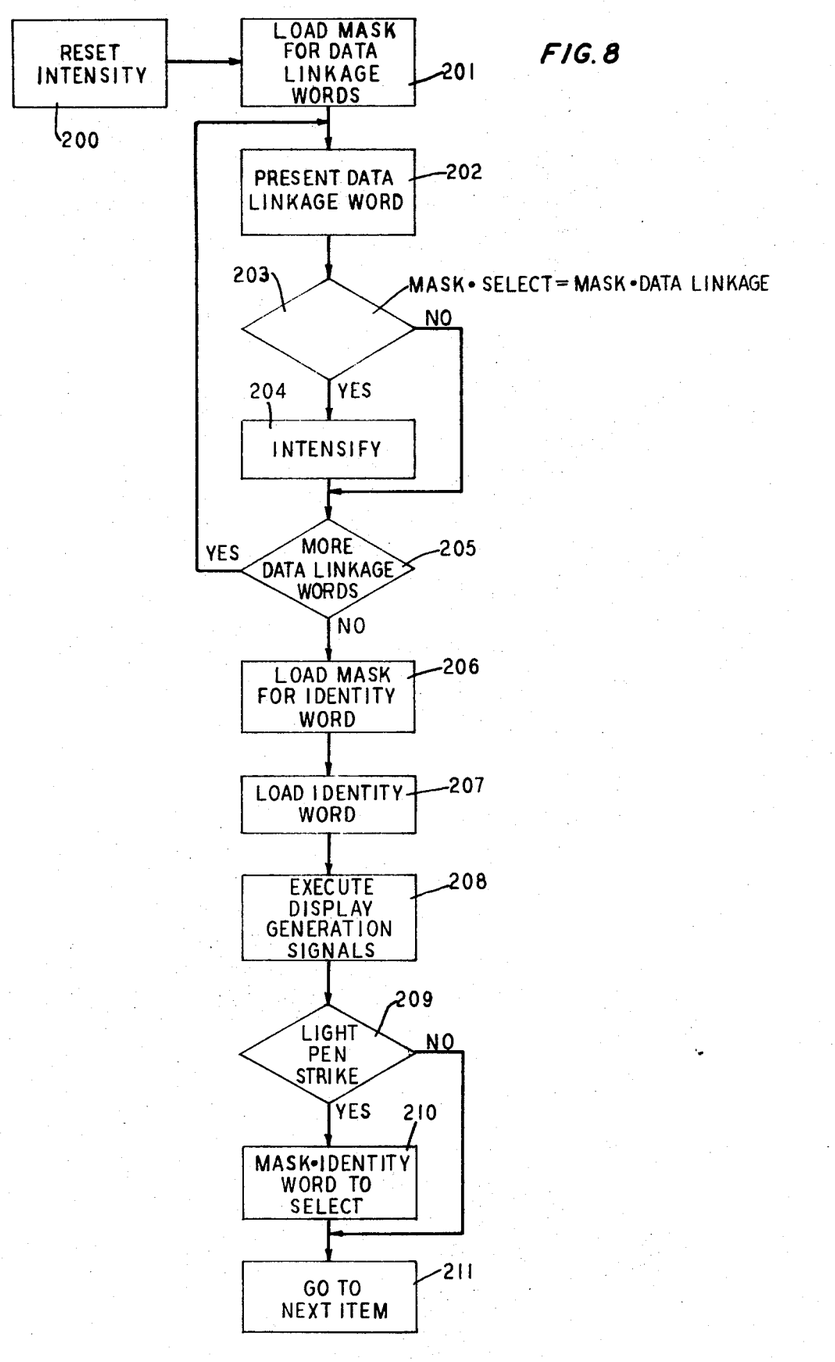
FIG. 8 is a flow chart of the algorithm performed by the logic circuitry.

The logic circuitry uses this data format to perform the general algorithm shown in the flow chart of FIG. 8. The display of a nonlight-button element would omit blocks 206 and 207, and the display of a light button element would omit blocks 202 to 205. The display of a dual function element would require all of the blocks shown in FIG. 8.

The logic circuitry that performs this algorithm is shown in FIG. 9.

Figure 9A:
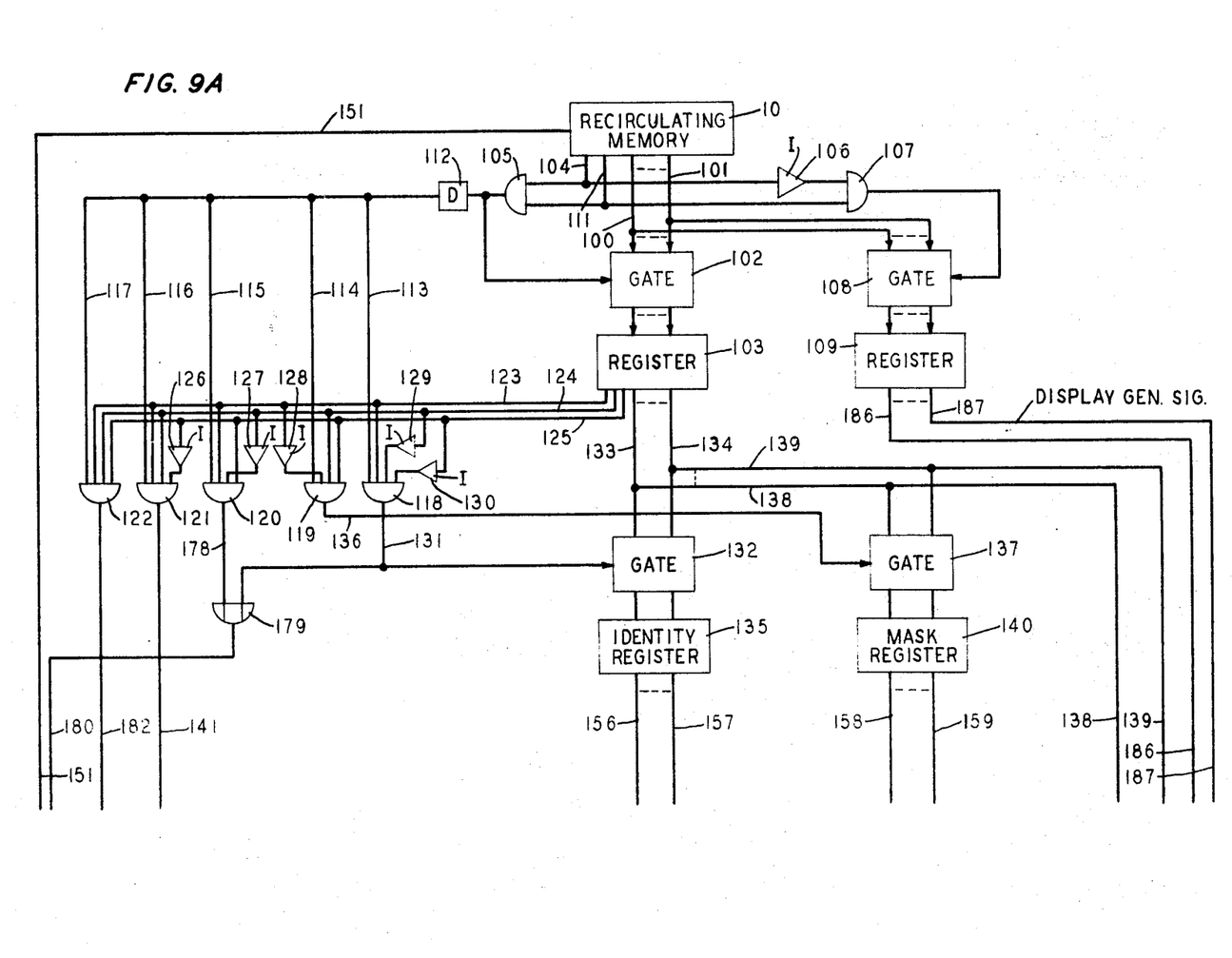
FIGS. 9A and 9B are diagrams of the logic circuitry that responds to light pen selections of portions of the data structure.
Figure 9B:
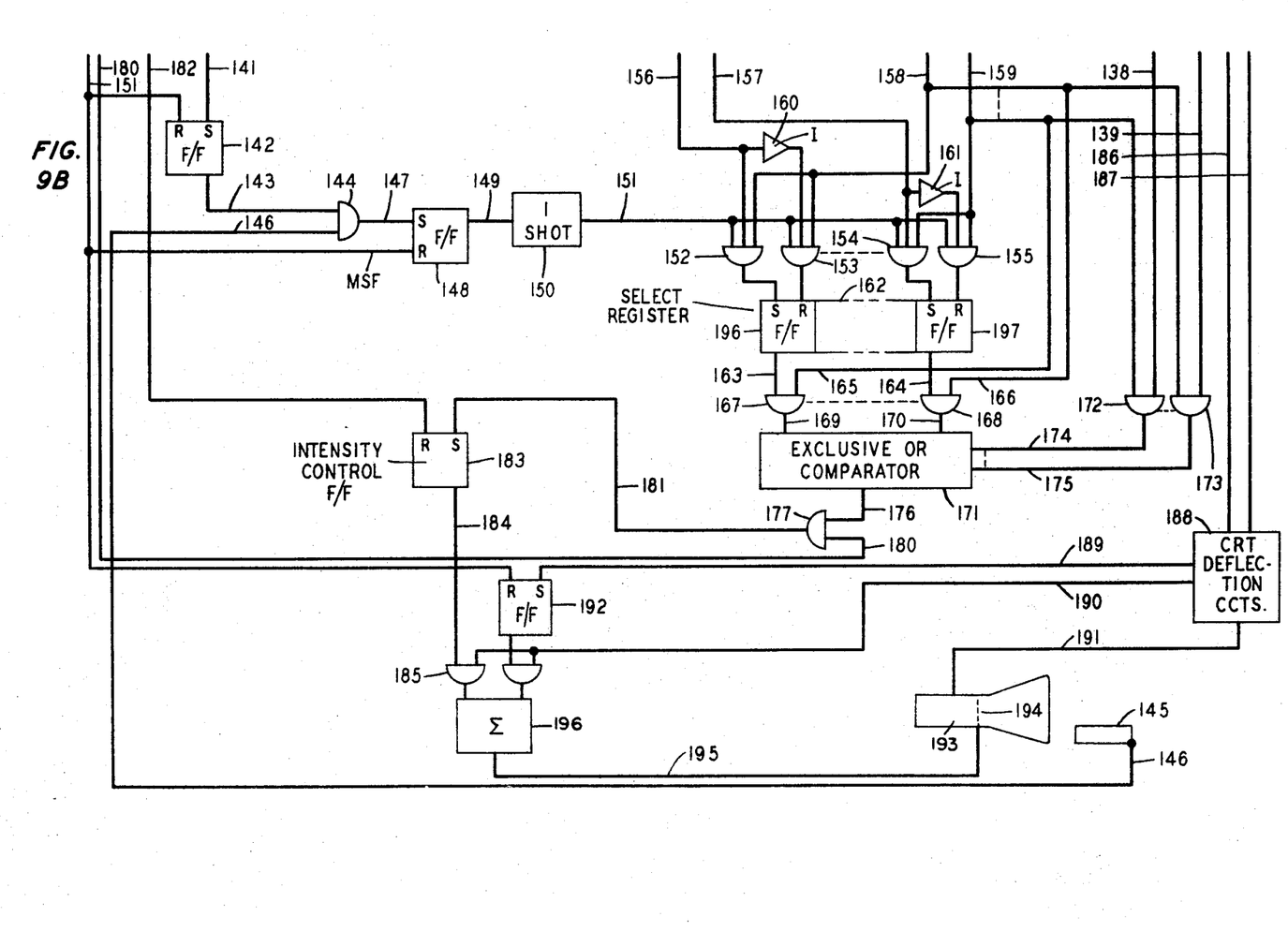

FIGS. 9A and 9B show the data lines 100, 101 that transfer data between recirculating memory 10 and gates 102, 108. The recirculating memory 10 generates a strobe pulse on line 111 each time a data word is read out. A bit in each data word is reserved for word steering and presents a "1" level on line 104 if the word is a data control word. The AND gate 105 uses this level to steer the strobe pulse on line 111 to allow the transfer of data control words through gate 102 into register 103. A "0" level on line 104 is converted to a "1" level by the inverter 106, and the strobe on line 111 is steered through AND gate 107 to allow the transfer of display-generating words through gate 108 into register 109.

When the strobe has been gated through AND gate 105 it passes through a delay 112, which is long enough to allow the gates to settle, and is distributed through lines 113, 114, 115, 116, and 117 to AND gates 118, 119, 120, 121, and 122, respectively, for steering. Each data control word has three bits which are used for strobe steering. These three bits are applied to AND gates 118—122 through lines 123, 124, and 125, respectively. Gate 122 recognizes the code 111, gate 121 uses inverter 126 to enable it to recognize the code 110, gate 120 uses inverter 127 to enable it to recognize the code 101, gate 119 uses inverter 128 to enable it to recognize 011, and gate 118 uses inverters 129 and 130 to enable it to recognize code 100.

Line 131 carries the strobe to gate 132 when the input to gate 118 is 100, indicating that the present word is an identity word. Gate 132 transfers identity words from lines 133, 134 to the identity register, 135.

Line 136 carries the strobe pulse to gate 137 when the input to gate 119 is 011 indicating that the present word is a mask word. Gate 137 transfers the mask word received from register 103 on lines 138, 139 to the mask register 140.

Line 141 carries the strobe pulse to flip-flop 142 when the input to gate 121 is 110 indicating that the light pen enable function is to be performed. When flip-flop 142 is set by signal on line 141 it produces a "1" level on line 143 which serves as one input to AND gate 144. The other input to AND gate 144 comes from light pen 145 on line 146. A "1" level on both lines 143 and 146 causes the output of AND gate 144 to be a "1" level on line 147 which goes into the SET input of flip-flop 148. The setting of flip-flop 148 causes a "1" level to appear on line 149 which in turn triggers monostable multivibrator 150. Both flip-flops 142 and 148 are reset by the memory start of frame pulse which appears on line 151 at the beginning of each cycle of recirculating memory 10.

Monostable multivibrator 150 thus provides a pulse on line 151 when light pen 145 has been enabled and has detected light. This signal serves to enable AND gates 152, 153, 154, 155 and allow the Boolean function (contents of identity register 135)
AND
(contents of mask register 140)

to be transferred to the select register 162. For example, a "1" signal on lines 151, 156, and 158 will set flip-flop 196 which is one bit in the select register 162. A "1" signal on lines 151 and 158 and a "0" signal on line 156, which is transformed to a "1" signal by inverter 160, results in flip-flop 196 being reset, that is, set to zero. Similar processes occur in gates 154, 155, inverter 161 and flip-flop 197. Thus when a light pen strike occurs, the appropriate bit field in identity register 135 is transferred to the select register 162 masked by the contents of mask register 140. After a sufficient number of light pen selections have occurred, the select register contains the format of a selected set. The number of selections necessary to constitute a "sufficient" number is determined by the data structure. In the example of FIGS. 3, 4, 5, and 6 two selections were required.

The combination of lines 163, 165 and AND gate 167, along with the combination of lines 164, 166 and AND gate 168, serve to provide the masked content of the select register 162 on lines 169, 170 for input to exclusive OR comparator 171. The lines 138, 139 and 158, 159 are ANDed in gates 172, 173 and provide another input to exclusive OR comparator 171 on lines 174, 175. The exclusive OR comparator 171 performs the exclusive OR function on its inputs on a bit by bit basis, OR's the result, and inverts the single output of the OR. This results in a "1" output on line 176 only if the respective bits of the two inputs match. Line 176 provides one input to AND gate 177. The other input is provided by line 180. Line 180 has a "1" signal only if one of the leads coming into OR gate 179 has a "1" signal. Line 131 has a "1" signal if the current word in register 103 is an identity word. Line 178 has a "1" signal if the current word in register 103 is a linkage word. It can be seen that a "match" signal on line 176 can pass through gate 177 only if the current word in register 103 is an identity word or a linkage word.

The occurrence of a "1" signal on line 181 can be summarized as follows. Masking the output of the select register 162 in the AND gates 167, 168 and the linkage word appearing in register 103 and hence on lines 138, 139 in the AND gates 172, 173 causes the proper field in the select register to be compared with the proper field in the linkage word. A match indicates that the element about to be displayed should be displayed brighter than normal. A match will occur if either the element currently being displayed was previously selected with the light pen or because it is a member of a class of sets determined by previous light pen selections.

A "1" signal on lead 181 sets intensity control flip-flop 183. Flip-flop 183 is reset at the beginning of the display sequence for each element by a signal on lead 182 from AND gate 122 when leads 123, 124, 125 each contain "1" levels. Intensity control flip-flop 183 provides a "1" level on line 184 when it is set. Line 184 is one input to AND gate 185. The other input is the "beam on" signal on line 190 from the cathode-ray tube deflection circuits 188. The "beam on" signal is absent whenever the electron beam is being positioned to display an element, thus retrace lines remain invisible regardless of when light pen selections occur. The "beam on" signal is derived by the cathode-ray tube deflection circuits 188 from the display-generating signals appearing on lines 186, 187. The cathode-ray tube deflection circuits 188 provide an output on lead 191 which causes the beam of cathode-ray tube 193 to move through the desired pattern as expressed in the display-generating signals. The type of circuits represented by block 188 are sufficiently well known in the art as to require no further explanation.

A "1" signal on line 189 sets flip-flop 192. This flip-flop is reset by the memory start of frame signal on line 151 and is not set by a signal on line 189 until the normally invisible elements have been "displayed." Circuit 196 provides on line 195 the algebraic sum of its input levels. It can be seen that its output, which is applied to control grid 194 of cathode-ray tube 193 is therefore one of three levels; 0, 1, or 2, depending on whether a particular element is to be displayed at zero, normal, or bright intensity, respectively. It can therefore be seen that the function of intensity control flip-flop 183 is to increase by one level the intensity of a particular element causing a match.

It is to be understood that the above-described arrangements are merely illustrative of the numerous and varied other arrangements that are readily apparent to those skilled in the art. For example, the cathode-ray tube and light pen could be replaced with a rear projection display and a RAND tablet or other coordinate input device along with associated means well known in the prior art to correlate positional information with the data displayed at a particular position. This and other arrangements may readily be devised by those skilled in the art without departing from the spirit and scope of this invention.

What I claim is:

1. A display system comprising
recirculating memory means for storing first data signals representing graphical elements, second data signals representing predetermined linkages between said graphical elements, and third data signals representing a predetermined ordering of said graphical elements,
display means,
means responsive to said first data signals for displaying a first subplurality of said graphical elements on said display means,
means for identifying selected ones of said displayed graphical elements,
means responsive to both said identifying means and said second data signals for displaying a second subplurality of said graphical elements on said display means, and
means responsive to both said identifying means and said third data signals for modifying said first subplurality of said graphical elements so as to display graphical representations of said predetermined ordering.

2. A display system comprising memory means for storing first data signals representing graphical elements, second data signals representing predetermined classifications of said graphical elements, and third data signals representing a predetermined ordering of said classifications, display means, means responsive to said first data signals for displaying a first subplurality of said graphical elements on said display means, means for identifying selected ones of said displayed graphical elements, means responsive to both said identifying means and said second data signals for displaying a second subplurality of said graphical elements on said display means, and means responsive to both said identifying means and said third data signals for modifying said first subplurality of said graphical elements so as to display graphical representations of said predetermined ordering.

3. The display system according to claim 2 wherein said means for displaying a second subplurality of said graphical elements comprises means for displaying textual labels.

4. The display system according to claim 2 wherein said means for modifying said first subplurality of said graphical elements so as to display graphical representations of said predetermined ordering comprises means for altering the intensity of said identified elements.

5. A display system comprising memory means for storing first data signals representing graphical elements, second data signals representing predetermined classifications of said graphical elements, and third data signals representing a hierarchical ordering of said classifications, display means, means responsive to said first data signals for displaying a first subplurality of said graphical elements on said display means, means for identifying selected ones of said displayed graphical elements, means responsive to both said identifying means and said second data signals for displaying a second subplurality of said graphical elements on said display means, and means responsive to both said identifying means and said third data signals for modifying said first subplurality of said graphical elements so as to display graphical representations of said hierarchical ordering.

6. A display system comprising memory means for storing first data signals representing graphical elements, second data signals representing predetermined classifications of said graphical elements, and third data signals representing a predetermined ordering of said classifications, display means, means responsive to said first data signals for displaying said graphical elements on said display means, means for identifying selected ones of said displayed graphical elements, and means responsive to said identifying means, said second data signals, and said third data signals for modifying said displayed graphical elements so as to display graphical representations of said predetermined ordering.

7. A display system comprising memory means for storing first data signals representing graphical elements, second data signals representing predetermined classifications of said graphical elements, and third data signals representing a hierarchical ordering of said classifications, display means, means responsive to said first data signals for displaying said graphical elements on said display means, means for identifying selected ones of said displayed graphical elements, and means responsive to said identifying means, said second data signals, and said third data signals for modifying said displayed graphical elements so as to display graphical representations of said hierarchical ordering.

8. The method of selectively displaying the interrelationships of an ordered data base, said data base containing first stored representations of graphical elements, second stored representations of predetermined classifications of said graphical elements, and third stored representations of a predetermined ordering of said classifications, said method comprising the steps of:

displaying said graphical element representations;

selecting particular ones of said displayed graphical element representations;

using said selected graphical element representations and said second stored representations to select a particular one of said predetermined classifications;

using said particular one of said predetermined classifications along with said third stored representations to select the particular substructure of said ordered data base that corresponds to said selected graphical element representations; and modulating the displayed graphical elements of said particular substructure.